US012412972B2

(12) United States Patent
Gustafsson et al.

(10) Patent No.: US 12,412,972 B2
(45) Date of Patent: Sep. 9, 2025

(54) WIDEBAND BALUN ARRANGEMENT

(71) Applicant: Telefonaktiebolaget LM Ericsson (publ), Stockholm (SE)

(72) Inventors: David Gustafsson, Sävedalen (SE); Per Ingelhag, Alingsås (SE); Mingquan Bao, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 258 days.

(21) Appl. No.: 18/265,669

(22) PCT Filed: Dec. 7, 2020

(86) PCT No.: PCT/EP2020/084906

§ 371 (c)(1),
(2) Date: Jun. 6, 2023

(87) PCT Pub. No.: WO2022/122114

PCT Pub. Date: Jun. 16, 2022

(65) Prior Publication Data

US 2024/0079754 A1 Mar. 7, 2024

(51) Int. Cl.
*H01P 5/10* (2006.01)

(52) U.S. Cl.
CPC .................................. *H01P 5/1007* (2013.01)

(58) Field of Classification Search
CPC ................................. H01P 5/1007; H01P 5/10
USPC ............................................. 333/25, 26, 246
See application file for complete search history.

(56) References Cited

U.S. PATENT DOCUMENTS

2007/0001779 A1 1/2007 Asamura et al.
2009/0140823 A1* 6/2009 Lee ........................ H01P 11/00 333/26
2015/0288344 A1 10/2015 Poddar et al.

FOREIGN PATENT DOCUMENTS

JP S60 75101 A 4/1985

OTHER PUBLICATIONS

International Search Report and Written Opinion dated Jul. 14, 2021 issued in International Patent Application No. PCT/EP2020/084906 (9 pages).

(Continued)

*Primary Examiner* — Jorge L Salazar, Jr.
(74) *Attorney, Agent, or Firm* — Sonoda & Kobayashi Intellectual Property Law; Sarvajit S. Patil

(57) ABSTRACT

The present disclosure relates to a balun arrangement (14) comprising a slot (5) at least partially having a crossing slot width (ws, hs) running between a first longitudinal side (6) and a second longitudinal side (7) in at least a first metallization layer (2). The balun arrangement (14) further comprises an unbalanced first port ($P_1$) that is defined between a first connection (10) to the second side (7) of the slot (5) and a fourth connection (21) to the first side (6) of the slot (5) and a balanced second port ($P_2$) that is that is defined between a second connection (11) to the second side (7) of the slot (5) and a fifth connection (22) to the first side (6) of the slot (5). The balun arrangement (14) also comprises a balanced third port ($P_3$) that is defined between a third connection (12) to the first side (6) of the slot (5) and a sixth connection (23) to the second side (7) of the slot (5).

17 Claims, 8 Drawing Sheets

(56) References Cited

OTHER PUBLICATIONS

International Preliminary Report on Patentability dated Jan. 27, 2023 issued in International Patent Application No. PCT/EP2020/084906 (14 pages).
Wagner, S. et al., "Ultrawidebrand Compact 50:200 Ohm Guanella Balun Using Asymmetric Broadside-Coupled Lines", Proceedings of 2018 Asia-Pacific Microwave Conference, TH1-103-4, 2018 IEICE (3 pages).
Li, B. et al., "A Defected-Ground Coupled Line Section With Two Shorts for Wideband Balun Application", 2009, IEEE (3 pages).
Lin, K.C. et al., "A Simple Printed Compensated Balun for Enhanced Ultra-Wideband Performances", IEEE Microwave and Wireless Components Letters, vol. 24, No. 1, Jan. 2014 (3 pages).

* cited by examiner

WIDEBAND BALUN ARRANGEMENT

CROSS REFERENCE TO RELATED APPLICATIONS

This application is a 35 U.S.C. § 371 National Stage of International Patent Application No. PCT/EP2020/084906, filed Dec. 7, 2020, the disclosure of which is incorporated herein in its entirety.

TECHNICAL FIELD

The present disclosure relates to balun arrangements in RF (Radio Frequency) and micro/millimeter wave circuits.

BACKGROUND

The balun is an important circuitry used in a multitude of RF and microwave circuits such as push-pull amplifiers, balanced mixers, balanced multipliers, antenna feeds etc. Desired balun features are stable phase and amplitude balance within a broad, or wide, bandwidth, and in many cases low common mode impedance is also desired. In addition, at GHz-frequencies and higher, where circuits are made in PCB-, substrate-, or RFIC/MMIC-technology, it is most often required that the balun can be realized in a planar design.

Another well-known balun topology is the so-called Guanella balun, also known as the Guanella transmission line transformer. The performance of a planar Guanella balun is based on coupled lines and its performance is dependent on the ratio between the even and odd mode impedance for its coupled lines. Ideally, for any coupled line realization with finite even mode impedance, the Guanella balun will only have 0 dB and 180° amplitude- and phase balance at the frequency where the lines are 900 long. For any other frequency there will be a non-ideal balance. For this reason, the implementation of the Guanella balun may benefit from a defected ground structure (DGS), referring to the removal of the ground plane in the vicinity of the coupled lines, effectively increasing the even to odd mode impedance ratio.

One such example is presented in “A defected-ground coupled line section with two shorts for wideband balun application” by B. Li, X. Wu, J. Yang and W. Wu, 2009 Asia Pacific Microwave Conference, Singapore, 2009, pp. 2030-2032, doi:10.1109/APMC.2009.5385296 where a thin ground plane slot passes under the center of a 90° coupled line segment, effectively increasing the even mode impedance.

A common topology used to overcome the limitations imposed by the finite even mode impedance of coupled lines is the Marchand balun, also having a previously well-known ideal topology. The ideal Marchand balun has a phase and amplitude balance that is independent of the even and odd mode impedance of the coupled line segments, thereby enabling very large bandwidths. However, the wideband phase and amplitude balance requires that the even and odd mode impedance of the coupled lines maintain stable over frequency which seldom is the case in any real implementation.

In addition, the Marchand balun relies on coupled lines being 90 long at a center frequency, having the consequence that the input and output impedance of the balun becomes frequency dependent.

A general problem with wideband baluns implemented in planar technologies at GHz frequencies is that when driven in common mode, the balanced ports will see an open circuit impedance, or a strongly frequency dependent reactive impedance. Although common mode operation impedance is of less importance in applications where harmonic contents is negligible, there are many applications when it’s of highest importance. This is for instance the case for push-pull amplifiers where common mode operation needs to be short-circuited, or at least terminated width low impedance, at the output of the transistors in order to ensure high efficiency and linearity. Another example is balanced mixers where low common mode operation impedance can increase conversion gain.

It is therefore desired to provide a wideband balun that functions in a differential mode operation with low common mode operation impedance at the balanced ports.

SUMMARY

It is an object of the present disclosure to provide a balun arrangement that enables wideband capabilities in both common mode and differential mode operation.

This object is obtained by means of a balun arrangement comprising a slot at least partially having a crossing slot width running between a first longitudinal side and a second longitudinal side in at least a first metallization layer. The balun arrangement further comprises an unbalanced first port that is defined between a first connection to the second side of the slot and a fourth connection to the first side of the slot and a balanced second port that is that is defined between a second connection to the second side of the slot and a fifth connection to the first side of the slot. The balun arrangement also comprises a balanced third port that is defined between a third connection to the first side of the slot and a sixth connection to the second side of the slot.

This provides a compact and uncomplicated wideband balun arrangement that functions in a differential mode operation with low common mode operation impedance at the balanced ports. Since the slot is short-circuited at its ends, an increased impedance, or reduced coupling, will increase the differential mode bandwidth of the balun arrangement.

According to some aspects, the first connection runs from a first type terminal of the first port to a first ground connection at the second side of the slot, and the fourth connection runs from a second type terminal of the first port to a fourth ground connection at the first of the slot. The second connection runs from a first type terminal of the second port to a second ground connection at the second side of the slot, and the fifth connection runs from a second type terminal of the second port to a fifth ground connection at the first side of the slot. The third connection runs from a first type terminal of the third port to a third ground connection at the first side of the slot, and the sixth connection runs from a second type terminal of the third port to a sixth ground connection at the second side of the slot.

According to some aspects, the first connection, the second connection and the third connection cross the slot, wherein the length of each connection between the corresponding port ports and ground connection is equal to, or exceed the crossing slot width and has an electrical length that falls below 20°, and preferably below 10°, at a center frequency at a desired frequency band.

By minimizing the length of each connection, the common mode impedance can be made very low, ideally short circuit when electrical length equals 0°. Simultaneously, the amplitude and phase balance in differential mode becomes wideband by a proper design of the ground plane slot.

According to some aspects, the connections are in the form of microstrip conductors which are formed in at least one metallization layer.

This enables the balun arrangement to be realized in PCB technology.

According to some aspects, the microstrip conductors are formed in at least one metallization layer that is separate from the first metallization layer. According to some further aspects, the microstrip conductors are formed in at least two metallization layers that are separate from the first metallization layer.

This provides versatility regarding how to realize the balun arrangement.

According to some aspects, the slot comprises a maximum increased width that exceeds the crossing slot width.

This way, the coupling between opposite sides of the slot is reduced.

According to some aspects, the slot is terminated in an open circuit at an edge of a printed circuit board (PCB) that comprises the metallization layers.

This way, a more compact slot and balun arrangement is provided.

According to some aspects, the first connection and the second connection are merged into a combined connection such that the first connection and the second connection are one and the same, being connected to both the first port and the second port.

This way, a more compact slot and balun arrangement is provided.

According to some aspects, the slot is formed in a first metallization layer and a second metallization layer, such that the slot has a horizontal slot width and a vertical slot width defined by a height between the metallization layers. The metallization layers are electrically connected by vertical connections, where a respective first port and second port are defined across the slot width from the first metallization layer to the second metallization layer. A third port is defined across the slot width from the second metallization layer to the first metallization layer.

This provides versatility regarding how to realize the balun arrangement, taking advantage of a multilayer structure where the slot can be realized in different layers.

According to some aspects, the horizontal slot width $w_s$ is zero or negative.

This way, a slot can be formed even by means of horizontally meeting or overlapping ground planes in different layer, allowing the ports to be formed at the edge of, or within, the ground planes.

According to some aspects, the horizontal slot width has a positive value, and there is a first conductor and a second conductor in the first metallization layer. The first conductor extends over the slot and ends in the first port, and the second conductor extends over the slot and ends in the second port. There is a third conductor in the second metallization layer, where the third conductor extends over the slot and ends in the third port.

This object is also obtained by means of methods that are associated with the above advantages.

BRIEF DESCRIPTION OF THE DRAWINGS

The present disclosure will now be described more in detail with reference to the appended drawings, where.

DETAILED DESCRIPTION

Figure 1:
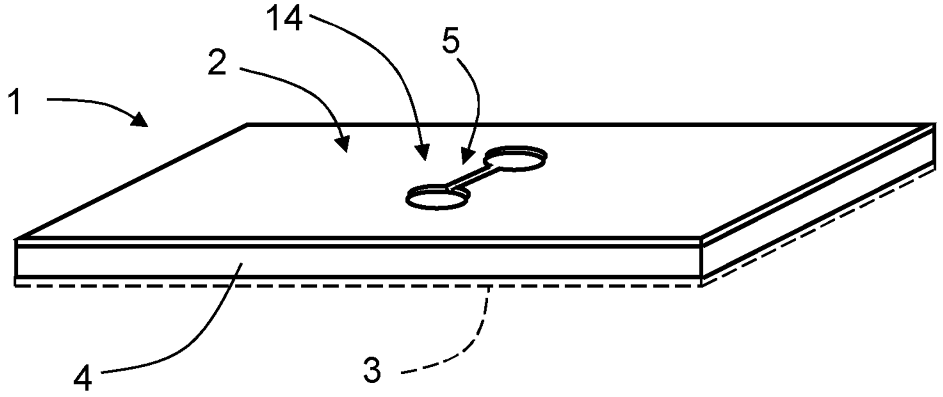
FIG. 1 shows a schematic perspective view of a PCB with a first example of a balun arrangement.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise. Ground is referring to RF ground, potentially via a capacitor.

Figure 2:
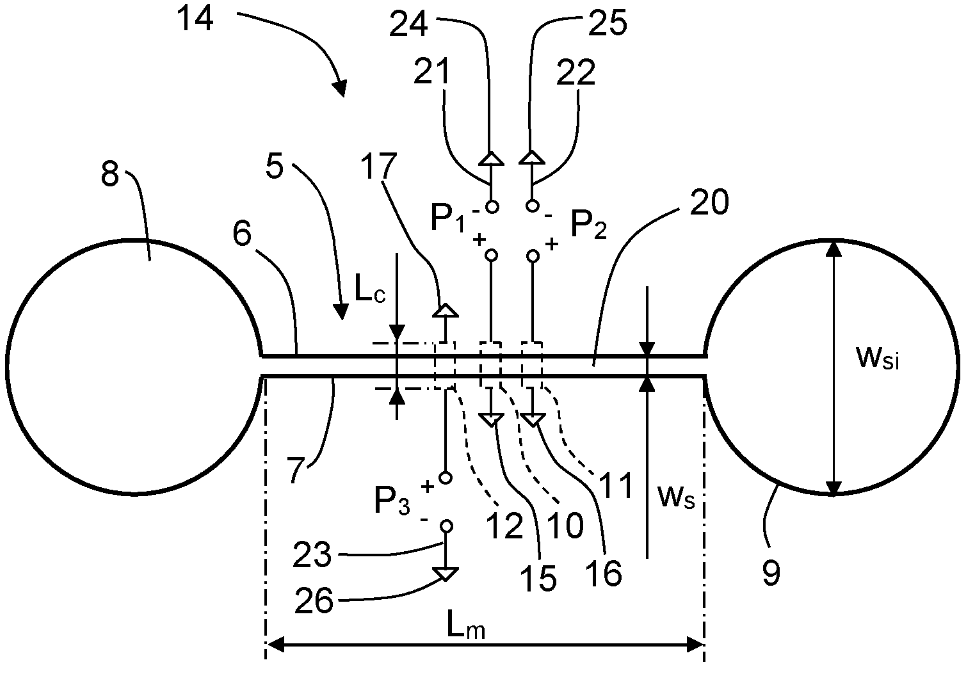
FIG. 2 shows a schematic first main side view of the first example of a balun arrangement.
Figure 3:
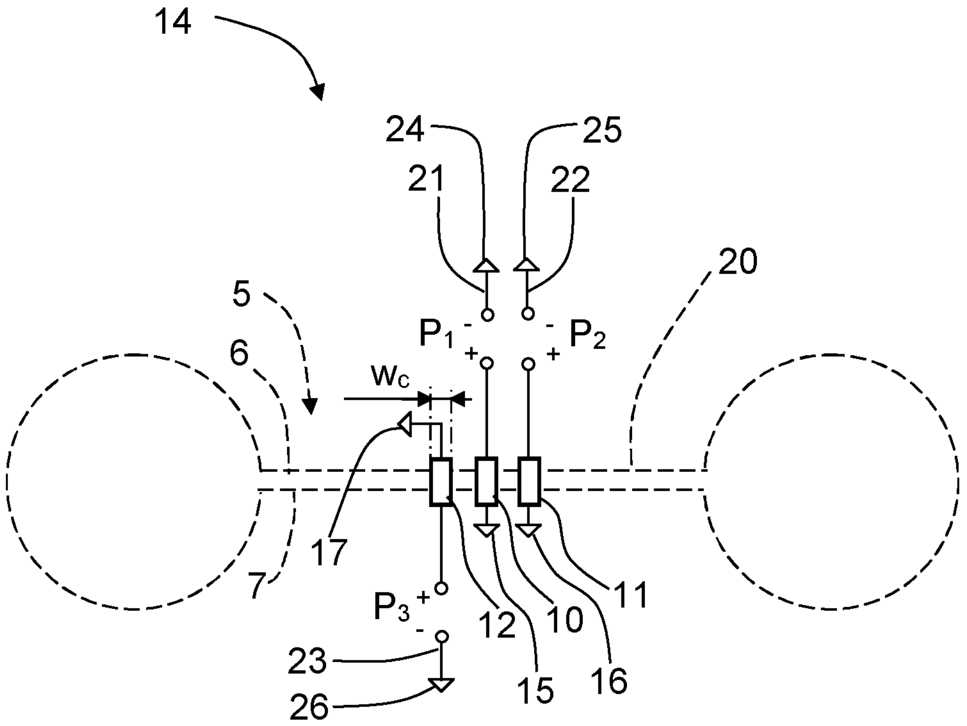
FIG. 3 shows a schematic second main side view of the first example of a balun arrangement.

With reference to FIG. 1, FIG. 2 and FIG. 3, there is a PCB 1 (printed circuit board) that comprises a first metallization layer 2, a second metallization layer 3 and an intermediate dielectric layer 4. The first metallization layer 2 constitutes a first ground plane and comprises a slot 5 having a mid section 20 with a slot width $w_s$, a first longitudinal side 6 and a second longitudinal side 7, where the slot 5 further has a first end part 8 with increased maximum slot width $w_{si}$ and a second end part 9 with the increased maximum slot width $w_{si}$. By means of this increased maximum slot width $w_{si}$, the coupling between opposite sides of the slot 5 is reduced.

The slot 5 is of the type defected ground structure (DGS), an unbalanced first port $P_1$ is connected to ground via a first galvanic connection that runs from the first port $P_1$ to a first ground connection 15. According to some aspects, the first galvanic connection is in the form of a first microstrip conductor 10 having a first characteristic impedance $Z_{C,10}$ and being formed in the second metallization layer 3, on the opposite PCB side of the slot 5. The slot 5 is used to separate a balanced second port $P_2$ and balanced third port $P_3$. The second port $P_2$ is connected to ground via a first galvanic connection that runs from the second port $P_2$ to a second ground connection 16. According to some aspects, the second galvanic connection is in the form of a second microstrip conductor 11 having a second characteristic impedance $Z_{C,20}$ and being formed in the second metallization layer 3. The third port $P_3$ is connected to ground via a third galvanic connection that runs from the first port $P_3$ to a third ground connection 17. According to some aspects, the second galvanic connection is in the form of a third microstrip conductor 12 having a third characteristic impedance $Z_{C,20}$ and also being formed in the second metallization layer 3. The third microstrip conductor 12 is connected to ground at an opposite side of the slot 5 compared to the first microstrip conductor 10 and the second microstrip conductor 11. The second metallization layer 3 is indicated with dashed lines in FIG. 1 since the initial metallization has been partly removed to form the microstrip conductors 10, 11, 12 and other traces and connections (not shown). The slot, the ports $P_1$, $P_2$, $P_3$ and the microstrip conductors 10, 11, 12 form a first example of a balun arrangement 14.

According to the present disclosure, the length $L_c$ of the microstrip conductors 10, 11, 12 should be kept at a minimum, at least the length $L_c$ should equal the slot width $w_s$, and the length $L_c$ should fall below an electrical length of 20°, preferably fall below an electrical length of 10°, and even more preferably fall below an electrical length of 5° at a center frequency of a desired frequency band. In case the microstrip conductors 10, 11, 12 are grounded by means of via connections, as will be described later, the via length is included in the length $L_c$ of the microstrip conductors 10, 11, 12.

For reasons of clarity, the length $L_c$ and width $w_c$ are indicated for the third microstrip conductor 12 only in the Figures, and the individual microstrip conductors 10, 11, 12 all have a corresponding length $L_c$ and width $w_c$ where the individual microstrip conductors 10, 11, 12 can have different lengths $L_c$ and different widths $w_c$, but the constraints above are always valid. The length $L_C$ of each galvanic connection 10, 11, 12 runs between the corresponding port $P_1$, $P_2$, $P_3$ and ground connection 15, 16, 17.

Although the galvanic connections are illustrated as microstrip conductors 10, 11, 12 in FIG. 2 and FIG. 3, other connections such as bond wires can also be used. The grounding of the microstrip conductors 10, 11, 12 can be made by via holes or other electrical connections, according to some aspects a capacitive connection. In the case of, for example, a capacitance being connected in series with the microstrip conductors 10, 11, 12, the microstrip conductors 10, 11, 12 do not constitute galvanic connections, but at least they constitute electric connections.

This shape of the slot 5 makes it possible to fairly accurate regard it as two parallel short-circuited transmission lines. The electrical length of these lines are preferably in the range 20°-120° at the center frequency. Since the slot 5 is short-circuited at its ends, an increased impedance, or reduced coupling, will increase the differential mode bandwidth of the balun arrangement.

The ports $P_1$, $P_2$, $P_3$ can be connected to other components such as for example transistors, and can be used in a push-pull amplifier arrangement. The ports $P_1$, $P_2$, $P_3$ can also be connected to microstrip or stripline transmission lines, bonding wires, or similar.

The slot 5 will act as a short-circuited slot line that according to some aspects should be made as wide as possible outside the mid section 20 in order to increase the bandwidth of the balun and with a proper length for the targeted bandwidth. The increased maximum slot width $w_{si}$ can be different at the different end parts 8, 9, and the end parts can be round, as shown here, or have any other shapes such as for example square or stepped structures where the width increases and/or decreases in steps to a maximum value, or a tapered part where the width increases continuously to a maximum value, where the maximum value can be anywhere in the end part. The slot can have any type of shape where different end parts can have different shapes. The mid section 20 has a length $L_m$ that should be kept as short as possible, and according to some aspects, the mid section 20 only runs where the microstrip conductors 10, 11, 12 cross the slot.

By minimizing the length $L_c$ of the microstrip conductors 10, 11, 12, a common mode impedance can be made very low, ideally short-circuit when the length $L_c \rightarrow 0°$. Simultaneously, the amplitude and phase balance in a differential mode becomes wideband by a proper design of the ground plane slot 5.

Here, a two-layer structure is shown where the microstrip conductors 10, 11, 12 are formed in a common metallization layer 3, but the balun arrangement can also be implemented in a multilayer structure. According to some aspects, the slot can be arranged in one or more metallization layers, and the microstrip/stripline conductors can be arranged in one, two or three other metallization layer. The microstrip/stripline conductors can thus be made in the same metal layer. In the case of the slot being formed in two or more metallization layers, the conductors can run between these metallization layers.

For example, the balanced second port $P_2$ and third port $P_3$ can be connected to ground via a corresponding electrical connection, such as a microstrip/stripline conductor, in one metallization layer, and the unbalanced first port $P_1$ can be connected to ground via an electrical connection, such as a microstrip/stripline conductor, in another metallization layer. The metallization layers could be on different sides of the ground planes and/or be an extension of the ground plane itself.

Figure 11:
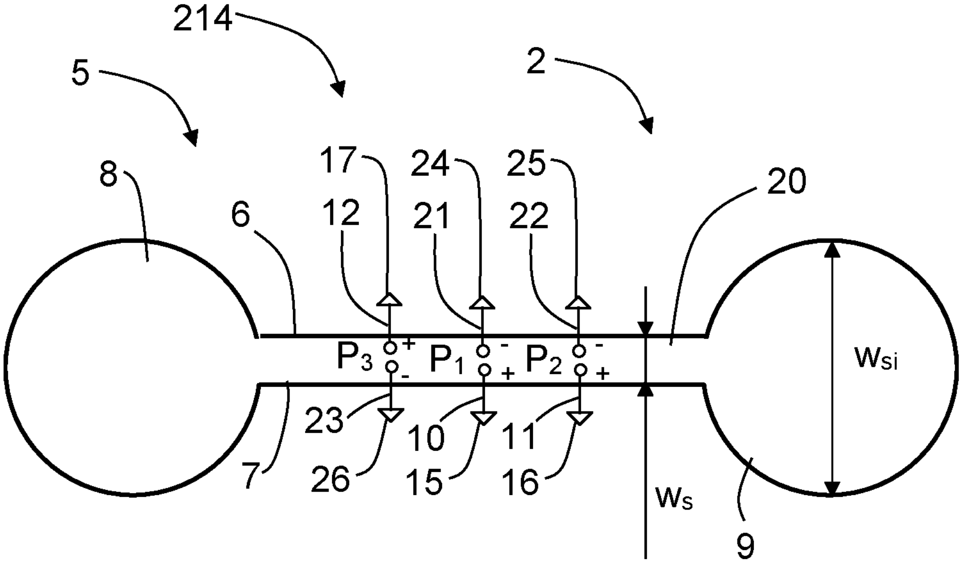
FIG. 11 shows a schematic first main side view of a general realization of the present disclosure.

Generally, as schematically shown in FIG. 11, the present disclosure relates to balun arrangement 214 comprising a first metallization layer 2 that in turn comprises a slot at least partially having a crossing slot width $w_s$, $w_h$ running between a first side 6 and a second side 7, where the balun arrangement 214 further comprises an unbalanced first port $P_1$ that is defined between a first connection 10 to the second side 7 of the slot 5 and a fourth connection 21 to the first side 6 of the slot 5. The balun arrangement 214 also comprises a balanced second port $P_2$ that is that is defined between a second connection 11 to the second side 7 of the slot 5 and a fifth connection 22 to the first side 6 of the slot 5, and a balanced third port $P_3$ that is defined between a third connection 12 to the first side 6 of the slot 5 and a sixth connection 23 to the second side 7 of the slot 5.

According to some aspects, the first connection 10 runs from a positive terminal + of the first port $P_1$ to a first ground connection 15 at the second side 7 of the slot 5, and the fourth connection 21 runs from a negative terminal – of the first port $P_1$ to a fourth ground connection 24 at the first side 6 of the slot 5. The second connection 11 runs from a positive terminal + of the second port $P_2$ to a second ground connection 16 at the second side 7 of the slot 5, and the fifth connection 22 runs from a negative terminal – of the first port $P_1$ to a fifth ground connection 25 at the first side 6 of the slot 5. The third connection 12 runs from a positive terminal + of the third port $P_3$ to a third ground connection 17 at the first side 6 of the slot 5, and the sixth connection 23 runs from a negative terminal – of the first port $P_1$ to a sixth ground connection 26 at the second side 7 of the slot 5.

Figure 4:
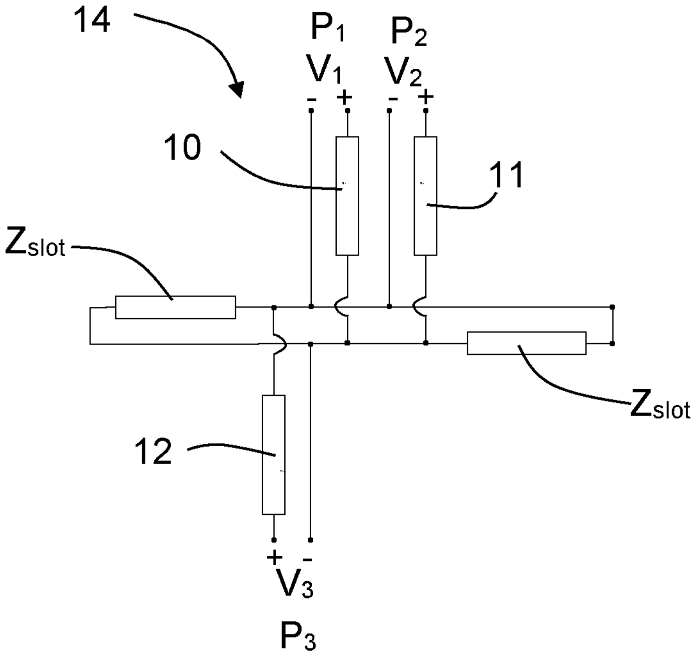
FIG. 4 shows a simplified equivalent circuit of the first example of a balun arrangement.

A simplified equivalent circuit of the topology for the balun arrangement 14 in FIG. 2 and FIG. 3 is shown in FIG. 4, where $Z_{slot}$ represents the slot 5. In the case of a having a slot with varying width and shape, as in FIG. 2 and FIG. 3, the equivalent model of the slot can be improved by cascading multiple transmission line models having varying impedances and lengths. Since the lengths $L_c$ of the microstrip conductors 10, 11, 12 are relatively short, their characteristic impedance only has minor effect on the overall functionality. The short length $L_c$ also ensures that although the microstrip conductors 10, 11, 12 are placed close to each other, the effect from their mutual coupling becomes low. According to some aspects, the term short refers to an electrical length of magnitudes as discussed above.

At the first port $P_1$ there is a first voltage $V_1$, at the second port $P_2$ there is a second voltage $V_2$, and at the third port $P_3$ there is a third voltage $V_3$. In a differential mode, the second voltage $V_2$ equals the negative third voltage $V_3$ such that $V_2=(-V_3)$. In a common mode, the second voltage $V_2$ equals the third voltage $V_3$ such that $V_2=V_3$. This is illustrated in FIG. 5A and FIG. 5B that shows the equivalent circuit, as seen from the second port $P_2$, when the second port $P_2$ and the third port $P_3$ are excited in differential mode and common mode, respectively.

Figure 5A:
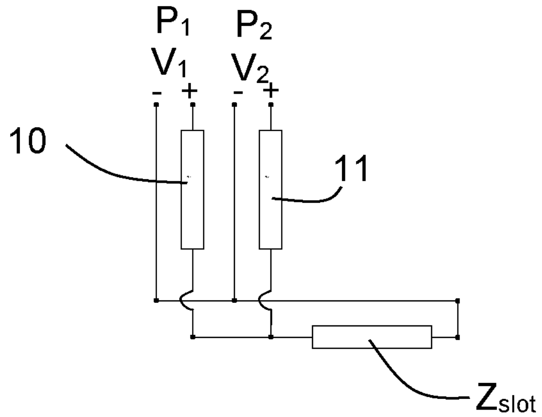
FIG. 5A shows a simplified equivalent circuit of the first example of a balun arrangement in a differential mode.
Figure 5B:
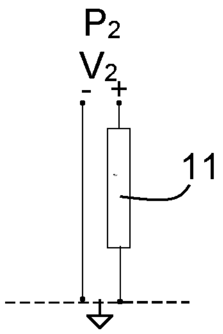
FIG. 5B shows a simplified equivalent circuit of the first example of a balun arrangement in a common mode.

As seen in FIG. 5A, at differential mode, the circuit simplifies to a shunt stub $Z_{slot}$, assuming that the microstrip conductors 10, 11, 12 are relative short. As seen in FIG. 5B, at common mode the circuit is a short transmission line connected to a virtual ground. Hence, the desired wideband low impedance at common mode is achieved when the second microstrip conductor 11 and the third microstrip conductor 12 are relatively short. The differential mode will experience a frequency dependence due to the short-circuited stub $Z_{slot}$, implying that a larger impedance of $Z_{slot}$ improves the bandwidth.

Figure 6:
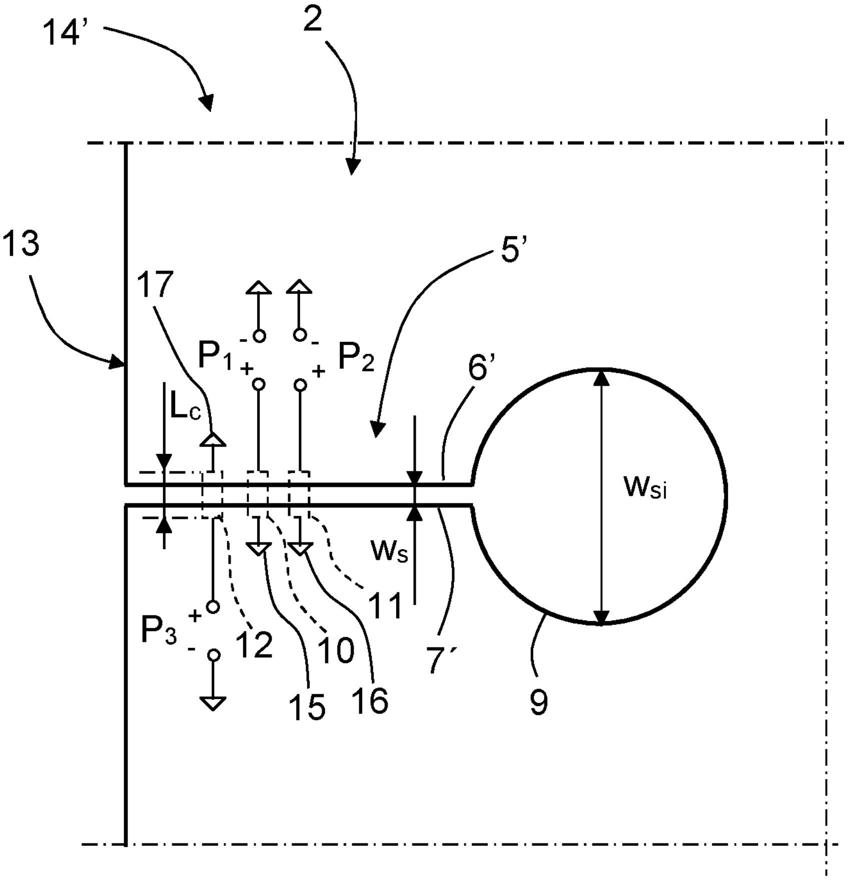
FIG. 6 shows a schematic first main side view of a second example of a balun arrangement.

FIG. 6 shows a second example of a balun arrangement 14' where the left side of the slot 5' is terminated in an open circuit at an edge 13 of the circuit board 1, resulting in a potentially larger differential mode bandwidth compared to the configuration in FIG. 2 and FIG. 3.

Figure 7:
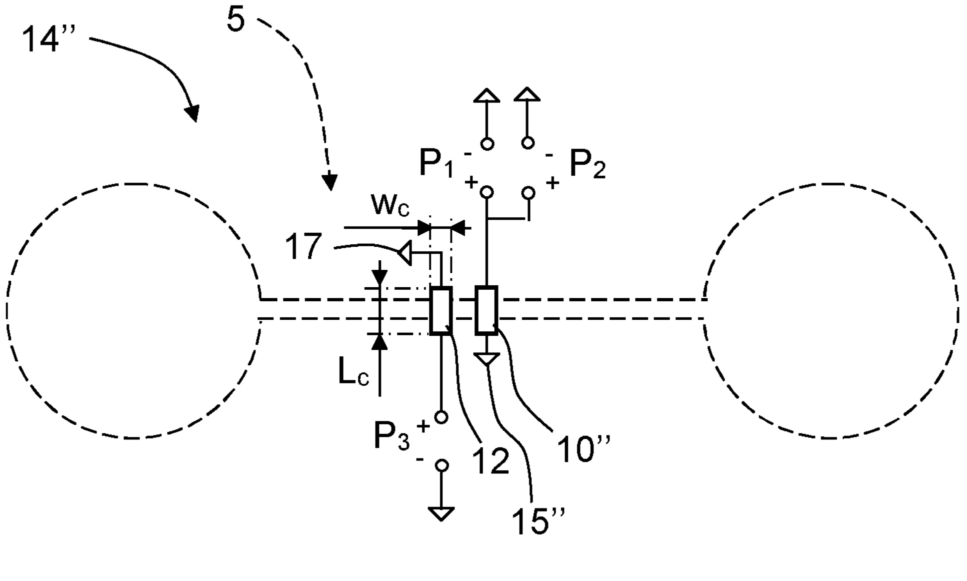
FIG. 7 shows a schematic second main side view of a third example of a balun arrangement.

FIG. 7 shows a third example of a balun arrangement 14". In FIG. 2 and FIG. 3, the first microstrip conductor 10 and the second microstrip conductor 11 are connected in parallel. In this example, they are merged into a combined microstrip conductor 10" across the slot 5.

Figure 8:
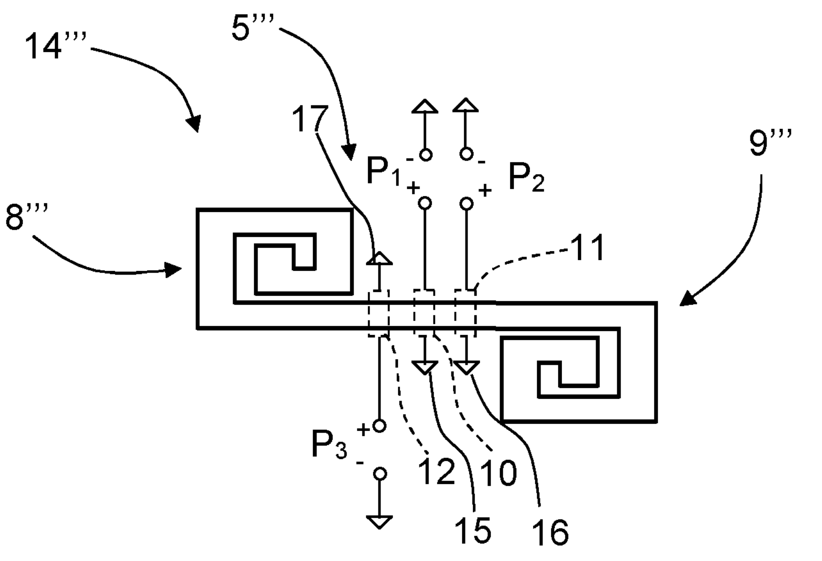
FIG. 8 shows a schematic first main side view of a fourth example of a balun arrangement.

It should be noted that the shape of the slot may take many different forms. For instance, FIG. 8 shows a fourth example of a balun arrangement 14'" that comprises a folded slot-line 5'" that is suitable when compact size is important.

Figure 9:
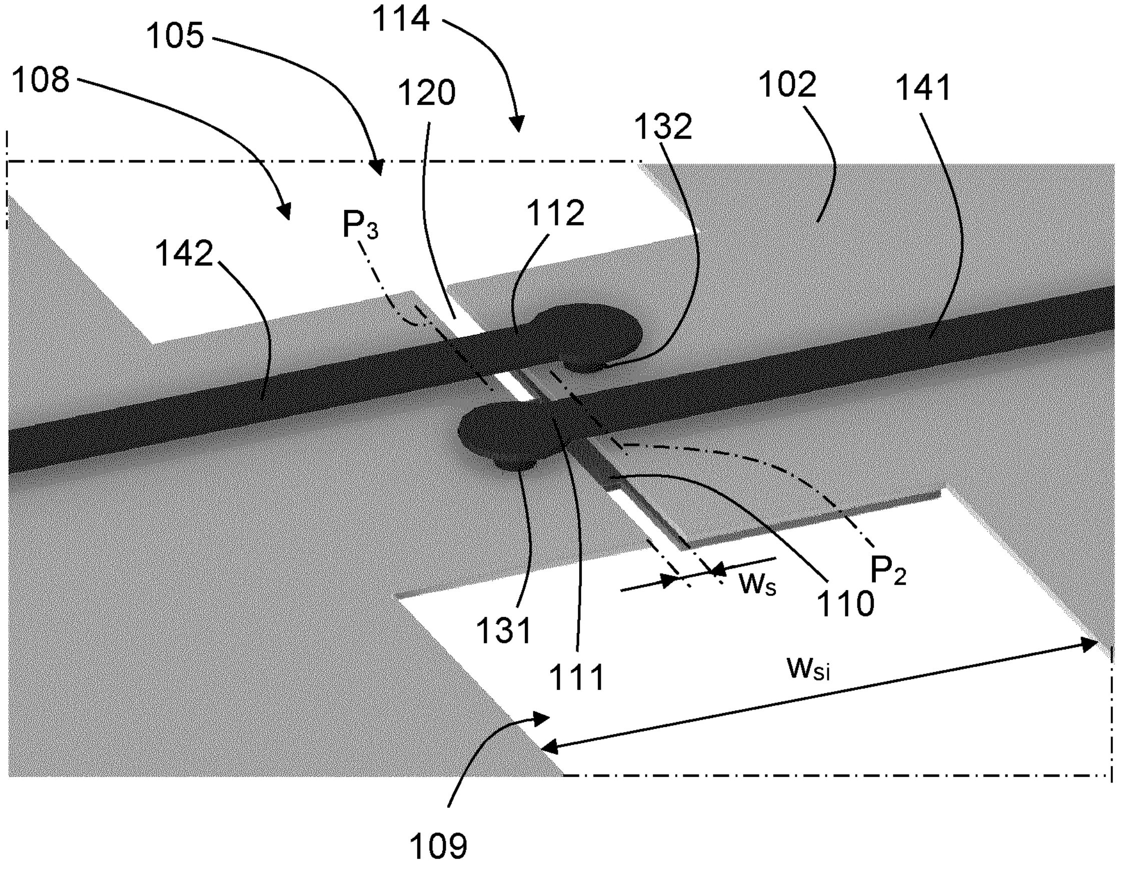
FIG. 9 shows a schematic first perspective view of a fifth example of a balun arrangement.
Figure 10:
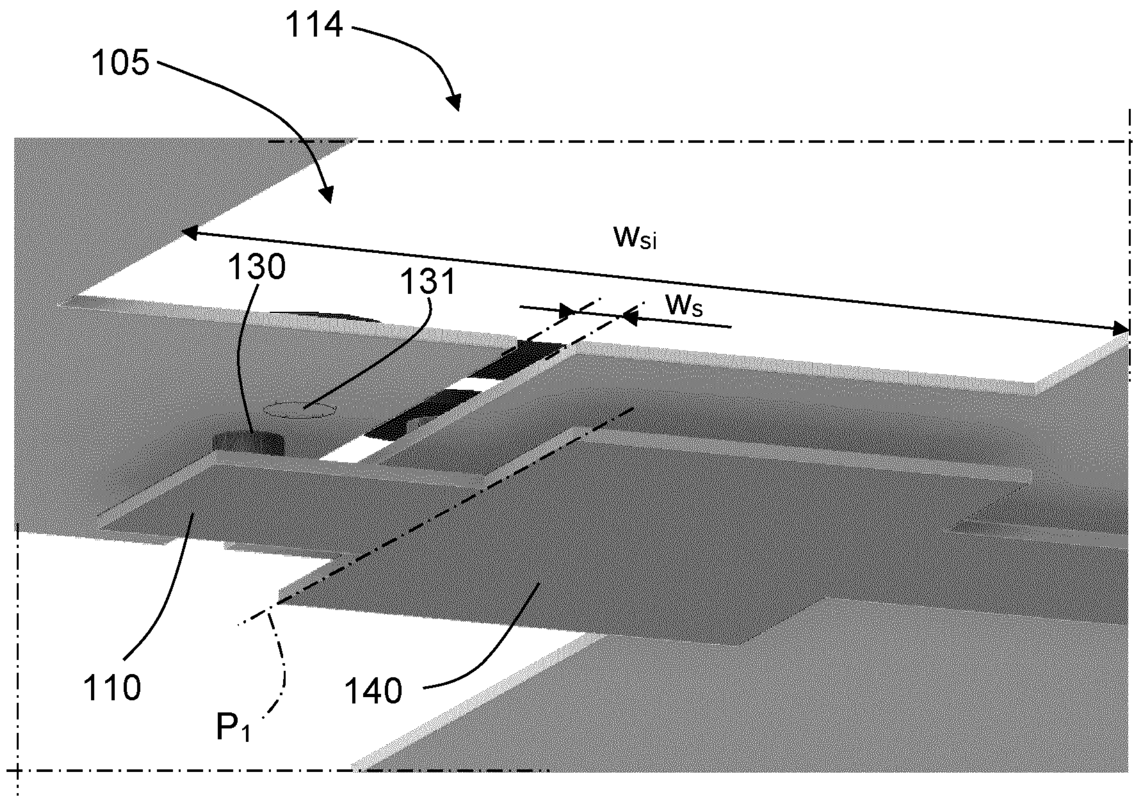
FIG. 10 shows a schematic second perspective view of the fifth example of a balun arrangement.

Another design example of the balun arrangement according to the present disclosure is shown in FIG. 9 and FIG. 10 that show perspective views of a fifth example of a balun arrangement 114 where a three metallization layer substrate is used.

The first conductor 110 runs on one side of the first metallization layer 102, and the second conductor 111 and the third conductor 112 run on an opposite side of the first metallization layer 102. The ports $P_1$, $P_2$, $P_3$ are defined between an end of the respective conductor 110, 111, 112, and the first metallization layer 102. Each port $P_1$, $P_2$, $P_3$ is in this example connected to a continuing corresponding first connecting conductor 140, second connecting conductor 141 and third connecting conductor 142 that runs in the same metallization layer as the corresponding conductor 110, 111, 112. The first conductor 110 is connected to ground in the first metallization layer 102 by means of a first via connection 130 at the other side of the slot 105 with reference to the first port $P_1$. The second conductor 111 is connected to ground in the first metallization layer 102 by means of a second via connection 131 at the other side of the slot 105 with reference to the second port $P_2$. The third conductor 112 is connected to ground in the first metallization layer 102 by means of a third via connection 132 at the other side of the slot 105 with reference to the third port $P_3$. The first via connection 130 and the second via connection 131 are on one side of the slot 105, and the third via connection 131 is on the other side of the slot 105. As shown in FIG. 10, the first connecting conductor 140 has a varying width, for example for providing an appropriate matching to the first port $P_1$.

In this example, the end parts 108, 109 having the increased maximum slot width $w_{si}$ are square, but can of course have any suitable shape. The slot 105 has a mid section 120 with the slot width $w_s$.

Figure 12:
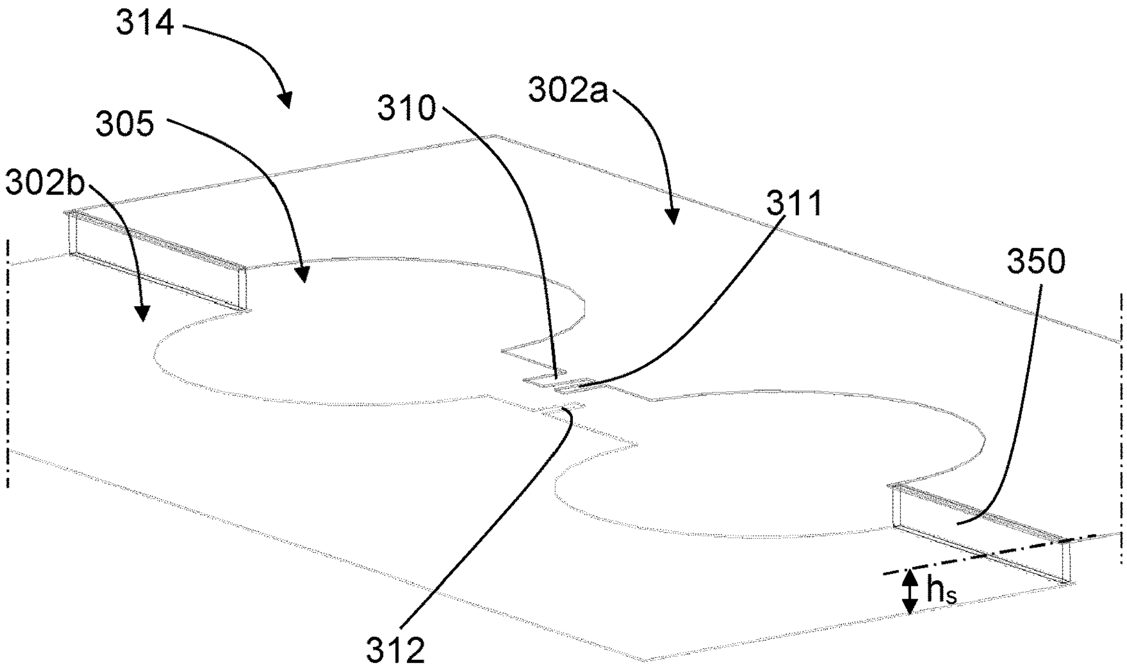
FIG. 12 shows a schematic perspective view of a sixth example of a balun arrangement.
Figure 13:
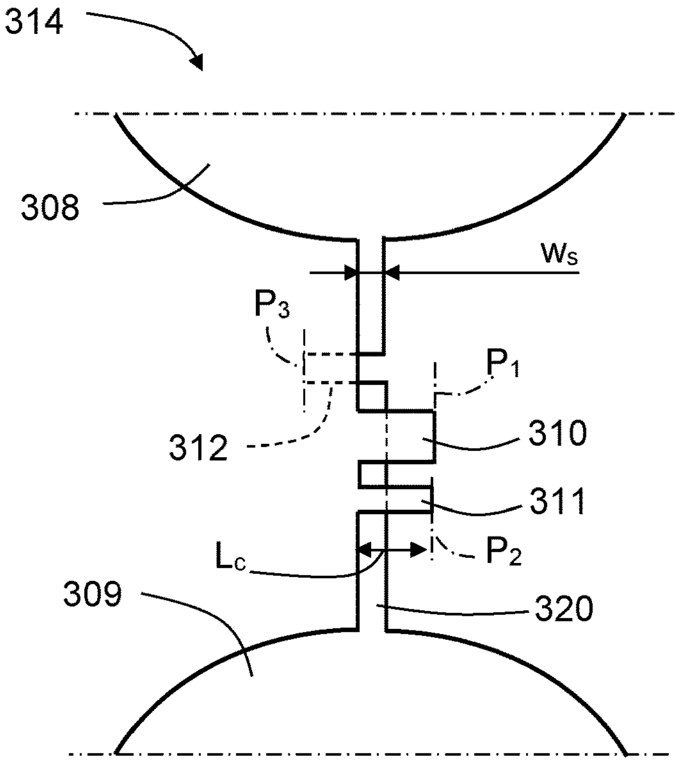
FIG. 13 shows a schematic enlarged top view of the sixth example of a balun arrangement.

Another design example of the balun arrangement according to the present disclosure is shown in FIG. 12 and FIG. 13 that show a perspective view and an enlarged top view of a sixth example of a balun arrangement 314 where a slot 305 that is formed in two different metallization layers 302*a*, 302*b* is used.

In a first metallization layer 302*a* there is a first conductor 310 and a second conductor 311 which extend over the slot 305 that has a horizontal slot width $w_s$. The conductors 310, 311 end in a respective first port $P_1$ and second port $P_2$ and are defined between the conductors' ends and a second metallization layer 302*b*. In the second metallization layer 302*b* there is a third conductor that extends over the slot 305 and ends in a third port $P_3$ that is defined between the conductor's end and the first metallization layer 302*a*.

A height $h_s$ between the metallization layers 302*a*, 302*b* defines a vertical slot width $h_s$ where the slot 305 is partially formed in the first metallization layer 302*a* and the second metallization layer 302*b*, being longitudinally divided over the slot gap that defines the slot width $w_s$ for a mid section 320 of the slot 305. The metallization layers 302*a*, 302*b* are electrically connected by vertical connections 350 such as for example vias or metal platings.

This means that the slot 305 that is formed in two different metallization layers 302*a*, 302*b*, and the ports $P_1$, $P_2$, $P_3$ are also formed in these layers 302*a*, 302*b*. The length $L_e$ of the conductors 310, 311, 321 should be sufficient to reach over the slot 305 across the horizontal slot width $w_s$. According to some aspects, the horizontal slot width $w_s$ can be reduced to zero, such that the slot 305 only has the vertical slot width $h_s$. In the case, the conductors 310, 311, 321 are not needed and the length $L_c$ is zero, and the ports $P_1$, $P_2$, $P_3$ can be formed directly at the longitudinal sides 106, 107. As mentioned previously, by minimizing the length $L_e$ of the conductors 310, 311, 312, a common mode impedance can be made very low, ideally short-circuit when the length $L_c \rightarrow 0°$.

Furthermore, it is conceivable the that the different metallization layers 302*a*, 302*b* and thus the longitudinal sides 106, 107 overlap, and in that case the horizontal slot width $w_s$ could be regarded as negative, and also the length $L_c$ could be regarded as negative. Then the ports $P_1$, $P_2$, $P_3$ can be formed in the corresponding metallization layer 302*a*, 302*b*, a certain distance from the corresponding longitudinal side 106, 107.

I other words, the ports $P_1$, $P_2$, $P_3$ can bee formed at the edge of, or within, the ground planes 302*a*, 302*b*.

It is to be noted that the ports $P_1$, $P_2$, $P_3$ and ground connections only are schematically indicated in the Figures, having a well-known characteristics. For example, the ports $P_1$, $P_2$, $P_3$ are adapted to enable an electrical connection to another component or a conductor of any type. The ground connections are adapted to provide a connection to a ground plane or similar, for example by means of a via connection to ground plane in another metallization layer.

A desired frequency band is a frequency band for which the balun arrangement is intended to be operational.

The balun arrangement can be realized in other techniques than PCB, for example the metallization layers can be formed as metal sheet parts that are separated by a dielectric spacing material that can be solid, liquid or gas, for example a foam material is possible. 3D-printed layered metal structures are also conceivable, where two or more layers, and even all layers, can be coherently formed.

Figure 14:
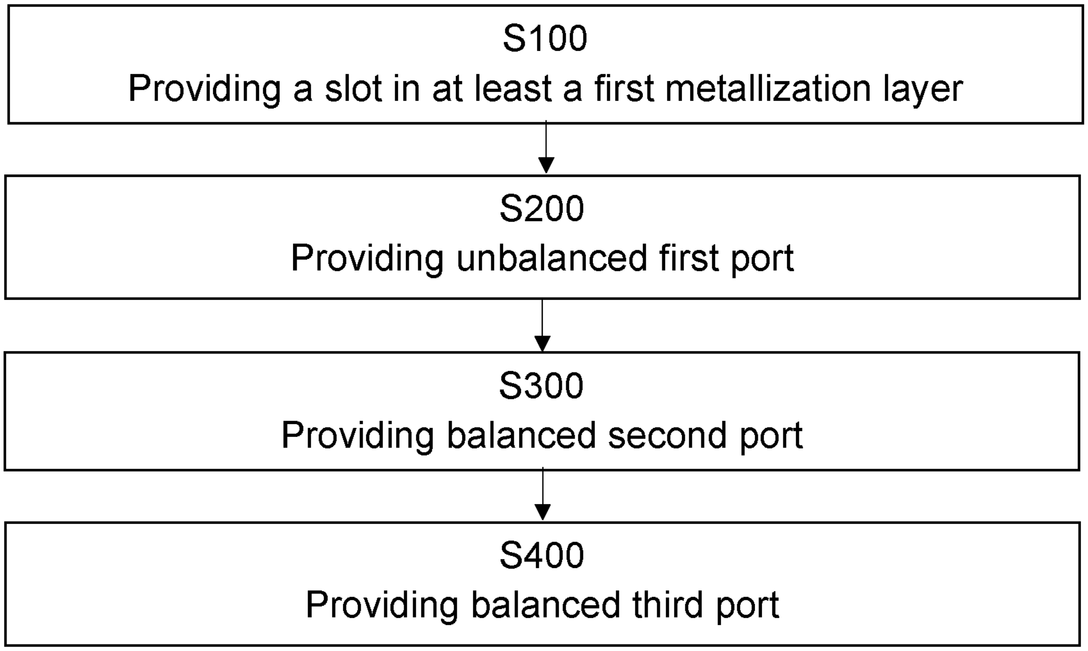
FIG. 14 shows a flowchart for methods according to the present disclosure.

With reference to FIG. 14, the present disclosure also relate to a method for configuring a balun arrangement 140, where the method comprises providing S100 a slot 5 at least partially having a crossing slot width $w_s$, $h_s$ running between a first longitudinal side 6 and a second longitudinal side 5 in at least a first metallization layer 2, The method further comprises providing S200 an unbalanced first port $P_1$ that is defined between a first connection 10 to the first side 6 of the slot 5 and a fourth connection 21 to the second side 7 of the slot 5 and providing S300 a balanced second port $P_2$ that is that is defined between a second connection 11 to the first side 6 of the slot 5 and a fifth connection 22 to the second side 7 of the slot 5. The method further comprises providing S400 a balanced third port $P_3$ that is defined between a third connection 12 to the first side 6 of the slot 5 and a sixth connection 23 to the second side 7 of the slot 5.

According to some aspects, the first connection 10, the second connection 11 and the third connection 12 cross the slot 5, wherein the length $L_C$ of each connection 10 between the corresponding port ports $P_1$, $P_2$, $P_3$ and ground connection 15, 16, 17 is equal to, or exceed the crossing slot width $w_s$ and has an electrical length that falls below 20°, and preferably below 10°, at a center frequency at a desired frequency band.

According to some aspects, the connections are in the form of microstrip conductors 10, 11, 12 which are provided in at least one metallization layer 3.

According to some aspects, the microstrip conductors 10, 11, 12 are formed in at least one metallization layer 3 that is separate from the first metallization layer 2.

According to some aspects, the microstrip conductors 110, 111, 112 are provided in at least two metallization layers that are separate from the first metallization layer 102.

According to some aspects, the slot 5 has a maximum increased width $w_{si}$ that exceeds the crossing slot width $w_s$, $w_h$.

According to some aspects, the slot 5' is terminated in an open circuit at an edge 13 of a printed circuit board, PCB, 1 that comprises the metallization layers 2, 3.

According to some aspects, the first connection and the second connection are merged into a combined connection 10" such that the first connection and the second connection are one and the same, being connected to both the first port $P_1$ and the second port $P_2$.

According to some aspects, the slot 5''' is a folded slot-line 5''' that comprises at least one folded part 8''', 9''' where the slot 5''' extends in different directions According to some aspects, the slot 305 is formed in a first metallization layer 302*a* and a second metallization layer 302*b*, such that the slot 305 has a horizontal slot width $w_s$ and a vertical slot width $h_s$ defined by a height $h_s$ between the metallization layers 302*a*, 302*b*. The metallization layers 302*a*, 302*b* are electrically connected by vertical connections 350, where a respective first port $P_1$ and second port $P_2$ are defined across the slot width $w_s$, $h_s$ from the first metallization layer 302*a* to the second metallization layer 302*b*. A third port $P_3$ is defined across the slot width $w_s$, $h_s$ from the second metallization layer 302*b* to the first metallization layer 302*a*.

According to some aspects, the horizontal slot width $w_s$ is zero or negative, where a negative slot width $w_s$ in this context corresponds to the metallizations layers or ground planes forming the slot being horizontally overlapping and vertically separated, i.e. being positioned in different layers in a multi-layer structure. When the horizontal slot width $w_s$ is zero, the metallizations layers or ground planes forming the slot are just about to horizontally overlap while being vertically separated. According to some aspects, in this context, the term horizontal means along the planes of the metallizations layers, perpendicular to being vertical.

According to some aspects, the horizontal slot width $w_s$ has a positive value, and there is a first conductor 310 and a second conductor 311 in the first metallization layer 302*a*, where the first conductor 310 extends over the slot 305 and ends in the first port $P_1$. The second conductor 311 extends over the slot 305 and ends in the second port $P_2$. There is a third conductor 312 in the second metallization layer 302*b*, where the third conductor 312 extends over the slot 305 and ends in the third port $P_3$.

The present disclosure is not limited to the above, but may vary freely within the scope the appended claims. For example, according to some aspects, the slot can have many other shapes than the ones disclosed.

In the present context, the PCB does not have to be a traditional PCB, but can be any layered structure such as for example MMIC (Monolithic Microwave Integrated Circuit), RFIC (Radio-Frequency Integrated Circuit), substrate, etc.

The positive terminals + and the negative terminals − can change place in all examples, and generally there is a first type terminal that can be either positive or negative, and a second type terminal that has a reversed polarity compared to the first type terminal.

According to some aspects, the ground symbols in the drawings denote a local ground or local reference plane, where the slot separates the grounds.

The invention claimed is:

1. A balun arrangement comprising a slot at least partially having a crossing slot width ($w_s$, $h_s$) running between a first longitudinal side and a second longitudinal side in at least a first metallization layer, where the balun arrangement further comprises:

an unbalanced first port ($P_1$) that is defined between a first electrical connection to the second longitudinal side of the slot and a fourth electrical connection to the first longitudinal side of the slot, a balanced second port ($P_2$) that is defined between a second electrical connection to the second longitudinal side of the slot and a fifth electrical connection to the first longitudinal side of the slot, and a balanced third port ($P_3$) that is defined between a third electrical connection to the first longitudinal side of the slot and a sixth electrical connection to the second longitudinal side of the slot, wherein:

the first electrical connection runs from a first type terminal (+) of the first port ($P_1$) to a first ground connection at the second side of the slot, and the fourth electrical connection runs from a second type terminal (−) of the first port ($P_1$) to a fourth ground connection at the first longitudinal side of the slot, the second electrical connection runs from a first type terminal (+) of the second port ($P_2$) to a second ground connection at the second side of the slot, and the fifth electrical connection runs from a second type terminal (−) of the second port ($P_2$) to a fifth ground connection at the first longitudinal side of the slot, and the third electrical connection runs from a first type terminal (+) of the third port ($P_3$) to a third ground connection at the first longitudinal side of the slot, and the sixth electrical connection runs from a second type terminal (−) of the third port ($P_3$) to a sixth ground connection at the second side of the slot.

2. The balun arrangement according to claim 1, wherein the electrical connections are in the form of microstrip conductors which are formed in at least one further metallization layer.

3. The balun arrangement according to claim 2, wherein the microstrip conductors are formed in the at least one further metallization layer that is separate from the first metallization layer.

4. The balun arrangement according to claim 3, wherein the microstrip conductors are formed in at least two further metallization layers that are separate from the first metallization layer.

5. The balun arrangement according to claim 1, wherein the first electrical connection, the second electrical connection and the third electrical connection cross the slot, wherein a length ($L_C$) of each electrical connection between the corresponding port ports ($P_1$, $P_2$, $P_3$) and ground connection is equal to, or exceed the crossing slot width ($w_s$).

6. The balun arrangement according to claim 1, wherein the slot is formed in the first metallization layer and a second metallization layer, such that the slot has a horizontal slot width ($w_s$) and a vertical slot width ($h_s$) defined by a height ($h_s$) between the first and second metallization layers, where the first and second metallization layers are electrically connected by vertical electrical connections, where the first port ($P_1$) and the second port ($P_2$) are defined across the slot width ($w_s$, $h_s$) from the first metallization layer to the second metallization layer, and where the third port ($P_3$) is defined across the slot width ($w_s$, $h_s$) from the second metallization layer to the first metallization layer.

7. The balun arrangement according to claim 1, wherein the slot comprises a maximum increased width ($w_{si}$) that exceeds the crossing slot width ($w_s$, $w_h$).

8. The balun arrangement according to claim 1, wherein the slot is terminated in an open circuit at an edge of a printed circuit board, PCB, that comprises the first metallization layer.

9. The balun arrangement according to claim 1, wherein the slot is a folded slot-line that comprises at least one folded part where the slot extends in different directions.

10. A method for configuring a balun arrangement, the method comprising:

providing a slot at least partially having a crossing slot width ($w_s$, $h_s$) running between a first longitudinal side and a second longitudinal side in at least a first metallization layer;

providing an unbalanced first port ($P_1$) that is defined between a first electrical connection to the second longitudinal side of the slot and a fourth electrical connection to the first longitudinal side of the slot;

providing a balanced second port ($P_2$) that is defined between a second electrical connection to the second longitudinal side of the slot and a fifth electrical connection to the first longitudinal side of the slot; and providing a balanced third port ($P_3$) that is defined between a third electrical connection to the first longitudinal side of the slot and a sixth electrical connection to the second longitudinal side of the slot, wherein:

the first electrical connection runs from a first type terminal (+) of the first port ($P_1$) to a first ground connection at the second longitudinal side of the slot, and the fourth electrical connection runs from a second type terminal (−) of the first port ($P_1$) to a fourth ground connection at the first longitudinal side of the slot, the second electrical connection runs from a first type terminal (+) of the second port ($P_2$) to a second ground connection at the second longitudinal side of the slot, and the fifth electrical connection runs from a second type terminal (−) of the second port ($P_2$) to a fifth ground connection at the first longitudinal side of the slot, and the third electrical connection runs from a first type terminal (+) of the third port ($P_3$) to a third ground connection at the first longitudinal side of the slot, and the sixth electrical connection runs from a second type terminal (−) of the third port ($P_3$) to a sixth ground connection at the second longitudinal side of the slot.

11. The method according to claim 10, wherein the electrical connections are in the form of microstrip conductors which are provided in at least one further metallization layer.

12. The method according to claim 11, wherein the microstrip conductors are formed in the at least one further metallization layer that is separate from the first metallization layer.

13. The method according to claim 12, wherein the microstrip conductors are provided in at least two further metallization layers that are separate from the first metallization layer.

14. The method according to claim 10, wherein the slot has a maximum increased width ($w_{si}$) that exceeds the crossing slot width ($w_s$, $w_h$).

15. The method according to claim 10, wherein the first electrical connection, the second electrical connection and the third electrical connection cross the slot, wherein a length ($L_C$) of each electrical connection between the corresponding port ports ($P_1$, $P_2$, $P_3$) and ground connection is equal to, or exceed the crossing slot width ($w_s$).

16. The method according to claim 10, wherein the slot is terminated in an open circuit at an edge of a printed circuit board, PCB, that comprises the first metallization layer.

17. A balun arrangement comprising a slot at least partially having a crossing slot width ($w_s$, $h_s$) running between a first longitudinal side and a second longitudinal side in at least a first metallization layer, where the balun arrangement further comprises:

an unbalanced first port ($P_1$) that is defined between a first electrical connection to the second longitudinal side of the slot and a fourth electrical connection to the first longitudinal side of the slot, a balanced second port ($P_2$) that is defined between a second electrical connection to the second longitudinal side of the slot and a fifth electrical connection to the first longitudinal side of the slot, and a balanced third port ($P_3$) that is defined between a third electrical connection to the first longitudinal side of the slot and a sixth electrical connection to the second longitudinal side of the slot, wherein the slot is terminated in an open circuit at an edge of a printed circuit board, PCB, that comprises the first metallization layer.

* * * * *